(12) United States Patent
Liang et al.

(10) Patent No.: US 10,783,645 B2
(45) Date of Patent: Sep. 22, 2020

(54) APPARATUSES, METHODS, AND STORAGE MEDIUM FOR PREVENTING A PERSON FROM TAKING A DANGEROUS SELFIE

(71) Applicant: Wistron Corp., New Taipei (TW)

(72) Inventors: Chen Yi Liang, New Taipei (TW); Ming-Ru Syue, New Taipei (TW); Cheng-Lan Lee, New Taipei (TW)

(73) Assignee: Wistron Corp., New Taipei (TW)

( * ) Notice: Subject to any disclaimer, the term of this patent is extended or adjusted under 35 U.S.C. 154(b) by 67 days.

(21) Appl. No.: 15/974,632

(22) Filed: May 8, 2018

(65) Prior Publication Data

US 2019/0197694 A1    Jun. 27, 2019

(30) Foreign Application Priority Data

Dec. 27, 2017   (TW) .............................. 106145980 A (51) Int. Cl.
*G06T 7/194*       (2017.01)
*G06K 9/00*        (2006.01)
(Continued)

(52) U.S. Cl.
CPC ............ *G06T 7/194* (2017.01); *G06K 9/0063* (2013.01); *G06K 9/00221* (2013.01);
(Continued)

(58) Field of Classification Search
CPC .. G08B 27/003; G08B 29/185; G08B 17/117; G08B 29/04; G08B 13/19602;
(Continued)

(56) References Cited

U.S. PATENT DOCUMENTS 5,759,044 A * 6/1998 Redmond ............... G06F 3/012
                                                348/383
6,141,041 A * 10/2000 Carlbom ............ A63B 24/0003
                                                348/157
(Continued)

FOREIGN PATENT DOCUMENTS

| CN | 105575045 A | 5/2016 |
| CN | 106534680 A | 3/2017 |
| TW | 201603613 A | 1/2016 |

OTHER PUBLICATIONS

Yishuo Huang, "Ground Truth Reconstruction From a Single Image," Oct. 2002, 11 pages, Taiwan.

*Primary Examiner* — Aklilu K Woldemariam (57) ABSTRACT

A method for preventing a person from taking a dangerous selfie is executed by a mobile electronic apparatus including a multi-axis sensing device and an image acquisition device disposed on a surface of the mobile electronic apparatus. The method includes the following steps: using the image acquisition device operating in a shooting mode to capture an image of the person in a background; using the multi-axis sensing device to detect orientation information of the mobile electronic apparatus; determining whether the person is in a potentially dangerous environment according to the orientation information and the image; and enabling the image acquisition device to suspend or exit the shooting mode when the person is in the potentially dangerous environment.

17 Claims, 10 Drawing Sheets

(51) Int. Cl.
*G06T 7/50* (2017.01)
*G06K 9/22* (2006.01)

(52) U.S. Cl.
CPC ..... *G06K 9/00228* (2013.01); *G06K 9/00697* (2013.01); *G06K 9/22* (2013.01); *G06T 7/50* (2017.01)

(58) Field of Classification Search
CPC .......... G08B 13/19604; G06Q 10/0833; H04L 12/283; A61B 5/1071; A61B 5/4094; A61B 5/743; G01N 33/0031; G01S 17/89; G01S 7/4817; G08G 1/123; H01S 5/02252; G06K 9/00664; G06K 9/00234; G06K 9/00228; G06K 9/00369; G06K 9/00201; G06K 9/00221; G06K 9/00771; G06K 9/00832; G06K 9/6255; G06K 9/62; G06K 9/6202; G06K 9/00335; G06K 9/52; H04N 5/23238; H04N 13/282; H04N 5/144; H04N 5/147; A63F 13/25; A63F 2300/69; B64C 2201/127; G02B 2027/0138; G02B 2027/014; G06F 3/015; G06F 16/5854; G06F 16/7837; G06F 16/786; G06F 16/583; G06T 17/00; G06T 7/194; G06T 7/20; G06T 7/246; G06T 7/66; G06T 7/73; G06T 2207/10016; G06T 7/70; G06T 7/75; A63B 2220/13; A63B 71/06
USPC ................ 382/100, 106, 173, 176, 190, 224
See application file for complete search history.

(56) References Cited

U.S. PATENT DOCUMENTS

| | | | | |
|---|---|---|---|---|
| 6,292,575 B1* | 9/2001 | Bortolussi | .......... | G06K 9/00234 382/107 |
| 6,731,799 B1* | 5/2004 | Sun | .................. | G06K 9/00369 348/142 |
| 6,738,494 B1* | 5/2004 | Savakis | .............. | G06K 9/00234 382/100 |
| 7,123,745 B1* | 10/2006 | Lee | .................... | G06K 9/00771 382/103 |
| 7,809,192 B2* | 10/2010 | Gokturk | ............. | G06K 9/00375 382/176 |
| 9,028,407 B1* | 5/2015 | Bennett-Guerrero | ...................... | A61B 5/1121 600/301 |
| 9,846,999 B1 | 12/2017 | Pickover et al. | | |
| 2005/0072239 A1* | 4/2005 | Longsdorf | ........... | G05B 23/027 73/649 |
| 2006/0072811 A1* | 4/2006 | Porter | ................ | G06K 9/00228 382/159 |
| 2007/0003146 A1* | 1/2007 | Ko | ........................ | G08B 25/009 382/224 |
| 2008/0181507 A1* | 7/2008 | Gope | ....................... | G06T 7/194 382/190 |
| 2010/0033579 A1* | 2/2010 | Yokohata | ................. | G06K 9/32 348/169 |
| 2010/0278396 A1* | 11/2010 | Mitsuhashi | ........ | G06K 9/00624 382/118 |
| 2010/0295783 A1* | 11/2010 | El Dokor | .......... | G06K 9/00335 345/158 |
| 2011/0032378 A1* | 2/2011 | Kaneda | .............. | G06K 9/00248 348/222.1 |
| 2011/0193986 A1* | 8/2011 | Kojima | .............. | H04N 1/00488 348/222.1 |
| 2012/0313779 A1* | 12/2012 | Papaefstathiou | .... | G05D 1/0274 340/540 |
| 2015/0120596 A1* | 4/2015 | Fadell | ................ | G06Q 10/0631 705/330 |
| 2015/0127712 A1* | 5/2015 | Fadell | .................. | G08B 25/008 709/202 |
| 2015/0242689 A1* | 8/2015 | Mau | ...................... | G06F 16/583 382/190 |
| 2015/0364021 A1* | 12/2015 | Ur | .......................... | G08B 21/02 340/573.1 |
| 2016/0156880 A1* | 6/2016 | Teich | .................... | H04N 5/225 348/82 |
| 2016/0359325 A1* | 12/2016 | Kawata | ............... | H04L 12/2829 |
| 2018/0053394 A1* | 2/2018 | Gersten | ................ | H04N 5/91 |
| 2018/0349745 A1* | 12/2018 | Fryshman | .............. | A01M 5/04 |
| 2019/0026936 A1 | 1/2019 | Gorur Sheshagiri | ... | G06T 13/40 |

\* cited by examiner

APPARATUSES, METHODS, AND STORAGE MEDIUM FOR PREVENTING A PERSON FROM TAKING A DANGEROUS SELFIE

CROSS REFERENCE TO RELATED APPLICATIONS

This Application claims priority of Taiwan Application No. 106145980, filed on Dec. 27, 2017, and the entirety of which is incorporated by reference herein.

BACKGROUND OF THE APPLICATION

Field of the Application

The application relates generally to imaging applications or services, and more particularly, to apparatuses, methods, and storage medium for preventing a person from taking a dangerous selfie.

Description of the Related Art

With the rapid development of imaging technology, most mobile electronic apparatuses are equipped with front cameras to allow the user to take selfies. In a typical selfie scenario using a cellphone, the user may operate the cellphone either manually or using an assisting device (e.g., a selfie stick) to allow the front camera to face the user, and to take a picture of the user and/or the background. In addition, before taking the picture, the user may confirm the view of the front camera, which is displayed on the screen of the cellphone.

However, there are situations where accidents may occur in such selfie scenarios due to the user not noticing the dangerous environment behind him or her while taking the selfie. For example, the user may be taking a selfie near a cliff in some scenic area, or near the edge of a high spot in a building, and then accidentally fall from the high place. Therefore, it is desirable to have a solution for detecting and preventing dangerous selfies.

BRIEF SUMMARY OF THE APPLICATION

In one aspect of the application, a method for preventing a person from taking a dangerous selfie, executed by a mobile electronic apparatus comprising a multi-axis sensing device and an image acquisition device disposed on a surface of the mobile electronic apparatus, is provided. The method comprises the following steps: using the image acquisition device operating in a shooting mode to capture an image of the person in a background; using the multi-axis sensing device to detect orientation information of the mobile electronic apparatus; determining whether the person is in a potentially dangerous environment according to the orientation information and the image; and enabling the image acquisition device to suspend or exit the shooting mode when the person is in the potentially dangerous environment.

In another aspect of the application, a mobile electronic apparatus comprising an image acquisition device, a multi-axis sensing device, and a controller is provided. The image acquisition device is disposed on a surface of the mobile electronic apparatus, and is configured to capture an image of a person in a background. The multi-axis sensing device is configured to detect orientation information of the mobile electronic apparatus. The controller is configured to determine whether the person is in a potentially dangerous environment according to the orientation information and the image, and enable the image acquisition device to suspend or exit the shooting mode when the person is in the potentially dangerous environment.

Other aspects and features of the application will become apparent to those with ordinary skill in the art upon review of the following descriptions of specific embodiments of the method for preventing a person from taking a dangerous selfie and the mobile electronic apparatus.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
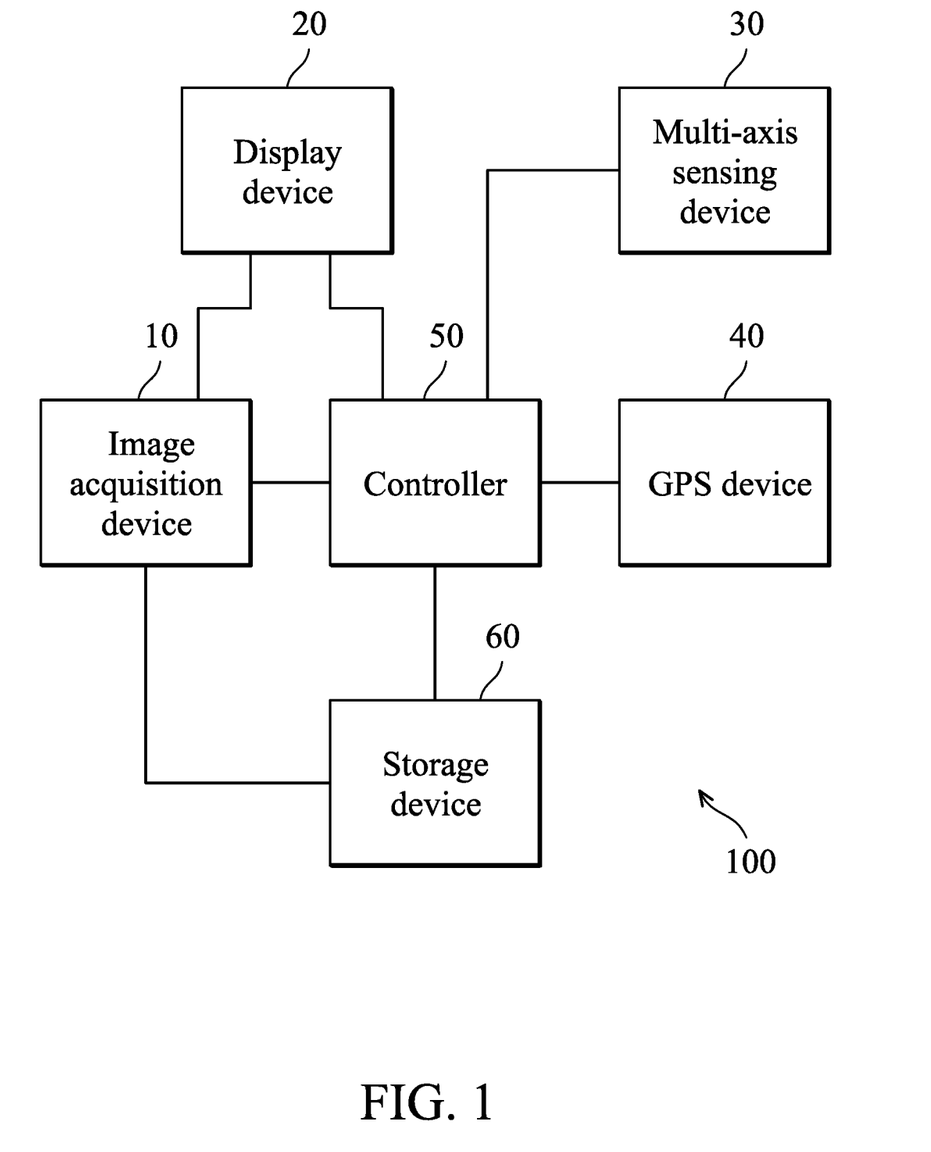
FIG. 1 is a block diagram illustrating the system architecture of a mobile electronic apparatus according to an embodiment of the application.

FIG. 1 is a block diagram illustrating the system architecture of a mobile electronic apparatus according to an embodiment of the application. The mobile electronic apparatus 100 includes an image acquisition device 10, a display device 20, a multi-axis sensing device 30, a Global Positioning System (GSP) device 40, a controller 50, and a storage device 60. The image acquisition device 10, the display device 20, the multi-axis sensing device 30, the GSP device 40, and the storage device 60 are coupled to the controller 50. In addition, the display device 20 and the storage device 60 are coupled to the image acquisition device 10.

The mobile electronic apparatus 100 may be a hand-held image or video camera, a cellphone or smartphone, a panel Personal Computer (PC), or any computing device supporting the selfie function.

The image acquisition device 10 may support different operation modes. When operating in the shooting mode, the image acquisition device 10 may capture images and support the function of digital zooming. When operating in the protection mode, the image acquisition device 10 may be suspended from capturing images, to protect the user from injury due to taking a selfie. The image acquisition device 10 may include one or more optics, such as see-through lens, and/or image sensors. In one embodiment, the mobile electronic apparatus 100 may be a smartphone, and the image acquisition device 10 may include the front camera and/or the back camera of the smartphone. In another embodiment, the image acquisition device 10 may include a three-dimensional (3D) camera which may be configured to capture images and obtain the depth information of the objects in the captured images (i.e., the distance from the mobile electronic apparatus 100 to the objects). The images captured by the image acquisition device 10 may be sent to the display device 20 for display, or may be sent to the controller 50 to be forwarded to the display device 20, or may be sent to the storage device 60 to be stored therein.

The display device 20 is responsible for displaying visual content and/or texts, such as the images captured by the image acquisition device 10. The display device 20 may be a Liquid-Crystal Display (LCD), Light-Emitting Diode (LED) display, Organic LED (OLED) display, Electronic Paper Display (EPD), or Cathode Ray Tube (CRT) display, etc. In one embodiment, the display device 20 may further include one or more touch sensors disposed thereon or thereunder for sensing touches, contacts, or approximations of objects, such as fingers or styluses, enabling the display device 20 to serve as an input device.

In one embodiment, both the image acquisition device 10 and the display device 20 may be disposed on the front surface of the mobile electronic apparatus 100 (e.g., the surface on which the user operates a smartphone).

In another embodiment, the image acquisition device 10 and the display device 20 may be disposed on different surfaces of the mobile electronic apparatus 100. For example, the image acquisition device 10 may be disposed on the back surface of the mobile electronic apparatus 100, and the display device 20 may be disposed on the front surface of the mobile electronic apparatus 100, wherein the display device 20 may be adhered to a mechanical structure which may move the display device 20 to face the same direction as the image acquisition device 10 does. For example, the display device 20 may be a revolvable screen.

The multi-axis sensing device 30 may include one or more types of sensor(s), such as an acceleration sensor, a magneto sensor (also called an electrical compass), a gyroscope sensor, and/or an altitude sensor. The acceleration sensor may be used to detect the acceleration of the mobile electronic apparatus 100. The magneto sensor may be used to detect changes in the magnetic field. The gyroscope sensor may be used to detect the angular velocity of the mobile electronic apparatus 100. The altitude sensor may be used to detect the horizontal height of the mobile electronic apparatus 100. Based on the detection result provided by the multi-axis sensing device 30, the orientation, including the spatial position, and the dip angle (i.e., the angle that the front surface of the mobile electronic apparatus 100 is facing relative to the horizontal line), and the horizontal height of the mobile electronic apparatus 100 may be determined.

The GPS device 40 is responsible for providing the positioning function. Specifically, the GPS device 40 may provide the 2D or 3D location (e.g., longitude and latitude information) of the mobile electronic apparatus 100 through communications with one or more satellites.

The controller 50 may be a general-purpose processor, Micro-Control Unit (MCU), Digital Signal Processor (DSP), Application Processor (AP), or any combination thereof, which includes various circuits for providing the function of data and image processing/computing, receiving image data from the image acquisition device 10, receiving detection result from the multi-axis sensing device 30 and the GPS device 40, and storing and retrieving data to and from the storage device 60. In particular, the controller 50 coordinates the image acquisition device 10, the display device 20, the multi-axis sensing device 30, the GSP device 40, and the storage device 60 for performing the method for preventing a person from taking a dangerous selfie.

As will be appreciated by persons skilled in the art, the circuits in the controller 50 will typically comprise transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 60 is a non-transitory computer-readable storage medium, including a memory, such as a FLASH memory or a Non-volatile Random Access Memory (NVRAM), or a magnetic storage device, such as a hard disk or a magnetic tape, or an optical disc, or any combination thereof for storing image data and instructions or program code of communication protocols, applications, and/or the method for preventing a person from taking a dangerous selfie.

The I/O device 60 may include one or more buttons, a keyboard, a mouse, a touch pad, a microphone, a speaker, and/or a light device, etc., serving as the Man-Machine Interface (MMI) for receiving user inputs and/or outputting prompt/feedback signals.

It should be understood that the components described in the embodiment of FIG. 1 are for illustrative purposes only and are not intended to limit the scope of the application. For example, the mobile electronic apparatus 100 may include additional components, such as an Input/Output (I/O) device, a power supply, and/or a wireless communication device. The I/O device may include one or more buttons, a keyboard, a mouse, a touch pad, a microphone, a speaker, and/or a light device, etc., serving as the Man-Machine Interface (MMI) for receiving user inputs and/or outputting prompt/feedback signals. The power supply may be a mobile/replaceable battery providing power to all the other components of the mobile electronic apparatus 100. The wireless communication device may provide the function of wireless communications to receive wireless signals (e.g., a wireless signal for controlling the image acquisition device 10 to capture image, a broadcast signal indicating that the current environment is dangerous), using a wireless technology, such as the Bluetooth technology, Wireless-Fidelity (WiFi) technology, Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

Figure 2:
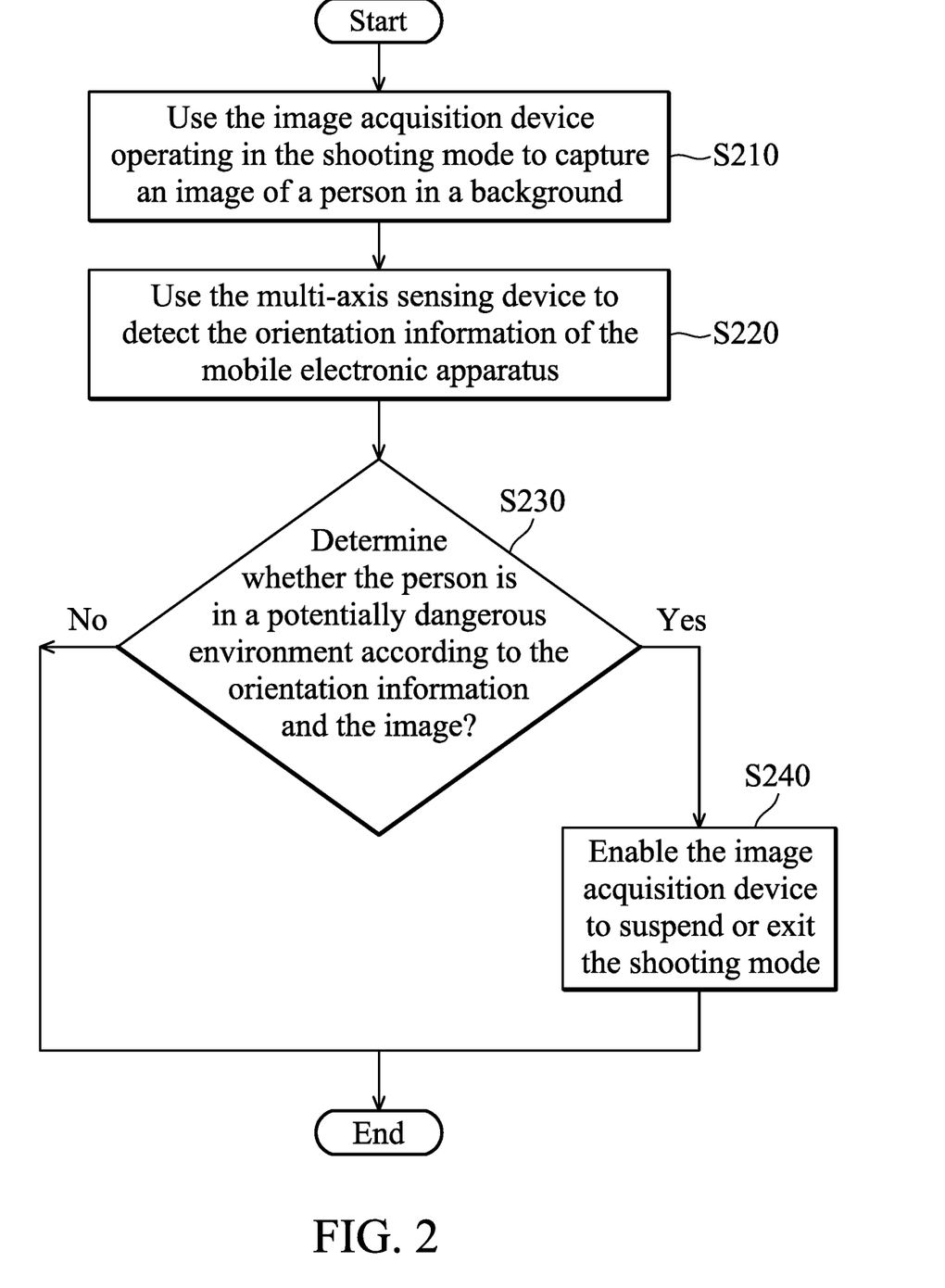
FIG. 2 is a flow chart illustrating the method for preventing a person from taking a dangerous selfie according to an embodiment of the application.

FIG. 2 is a flow chart illustrating the method for preventing a person from taking a dangerous selfie according to an embodiment of the application. In this embodiment, the method is applied to a mobile electronic apparatus capable of taking pictures, such as the mobile electronic apparatus 100, which at least includes an image acquisition device (e.g., image acquisition device 10) disposed on a surface (e.g., the front surface or back surface of the mobile electronic apparatus 100), and a multi-axis sensing device (e.g., the multi-axis sensing device 30).

To further clarify, the method may be implemented as a software module (e.g., an APP) consisting of program code which may be loaded and executed by a controller (e.g., the controller 50) of the mobile electronic apparatus.

To begin with, the mobile electronic apparatus uses the image acquisition device operating in the shooting mode to capture an image of a person in a background (step S210). In one embodiment, the mobile electronic apparatus may be a smartphone or a panel PC, the image acquisition device may refer to the front camera, and the shooting mode may refer to the selfie mode. In another embodiment, the mobile electronic apparatus may be a hand-held image or video camera, in which the screen may be operable to be revolved to face the same direction as the camera does.

Next, the mobile electronic apparatus uses the multi-axis sensing device to detect the orientation information of the mobile electronic apparatus (step S220). Specifically, the movements (e.g., a shift or rotation) of the mobile electronic apparatus cause changes in the orientation of the mobile electronic apparatus, wherein the orientation may be construed as the result of the mobile electronic apparatus rotating over the z-axis (e.g., the vertical axis pointing to the earth's core), y-axis (e.g., the eastern axis pointing to the geographical east), and x-axis (e.g., the northern axis pointing to the geographical north) in a coordinate system (e.g., the North East Down (NED) system). The rotation angle over the z-axis may be defined as the yaw angle $\psi$, the rotation angle over the y-axis may be defined as the pitch angle $\theta$, and the rotation angle over the x-axis may be defined as the roll angle $\phi$. The yaw angle $\psi$, the pitch angle $\theta$, and the roll angle $\phi$ may be determined according to the acceleration, the changes in the magnetic field, and the angular velocity detected by the multi-axis sensing device, and may be further used to determine the orientation, including the spatial position and the dip angle, of the mobile electronic apparatus. Please note that the detailed descriptions of the orientation determination are omitted herein since they are beyond the scope of the application.

Subsequent to step S220, the mobile electronic apparatus determines whether the person is in a potentially dangerous environment according to the orientation information detected by the multi-axis sensing device and the image captured by the image acquisition device (step S230). The potentially dangerous environment may include a cliff, a seashore, or the edge of a high spot in a building. The details of step S230 will be described later in FIGS. 5 and 6A-6D.

After that, the mobile electronic apparatus enables the image acquisition device to suspend or exit the shooting mode when the person is in the potentially dangerous environment (step S240). The suspension or exit of the shooting mode may prevent the person from taking selfies, by enabling the image acquisition device to enter the protection mode, or by suspending/deactivating the image acquisition device. Taking the mobile electronic apparatus being a smartphone as an example, the suspension or exit of the shooting mode may include deactivating the image acquisition device and returning the smartphone to the desktop view.

Subsequent to step 230, if it is determined that the person is not in a potentially dangerous environment, no action is performed and the method ends.

Figure 3A:
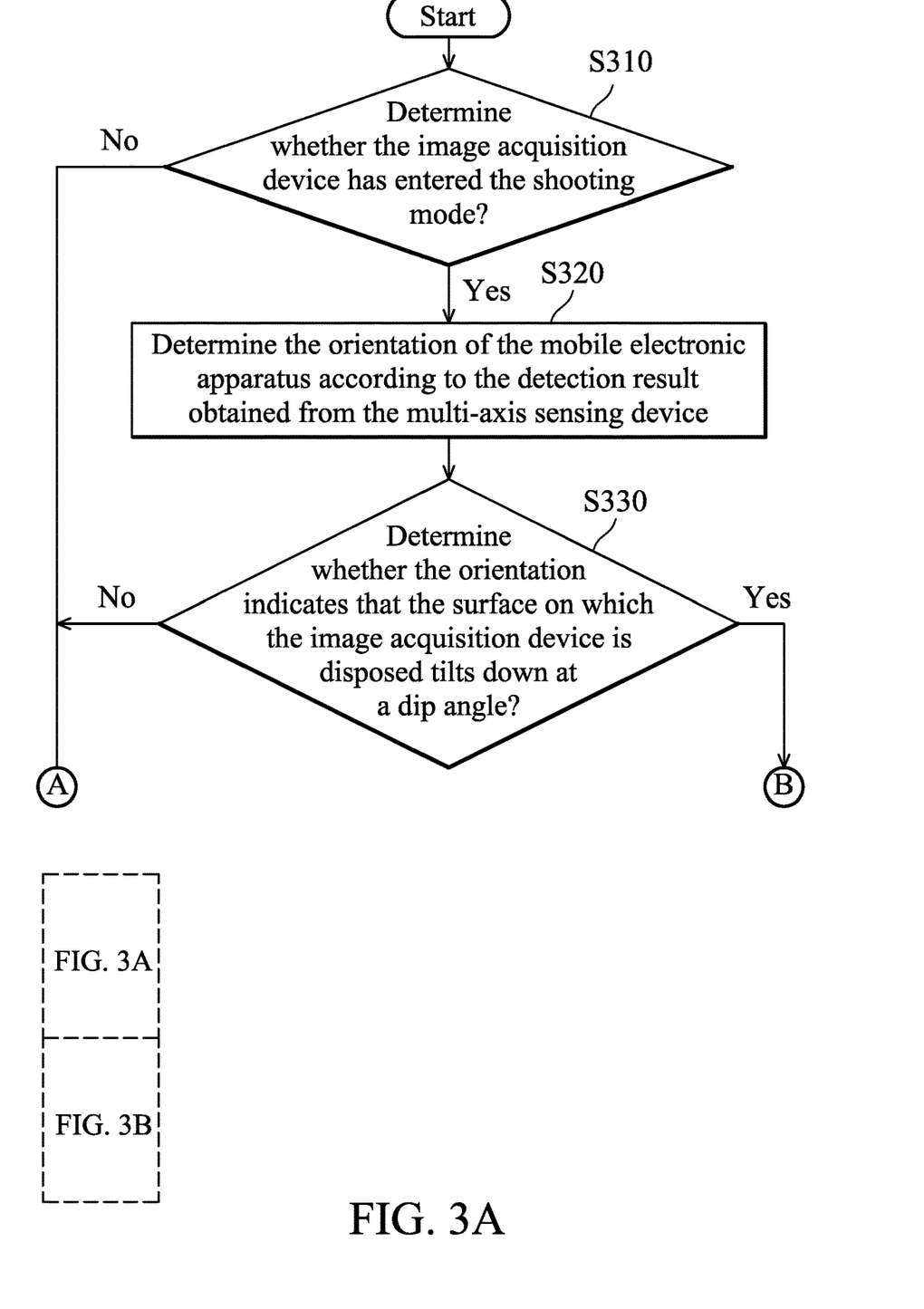
FIGS. 3A and 3B show a flow chart illustrating the method for preventing a person from taking a dangerous selfie according to another embodiment of the application.
Figure 3B:
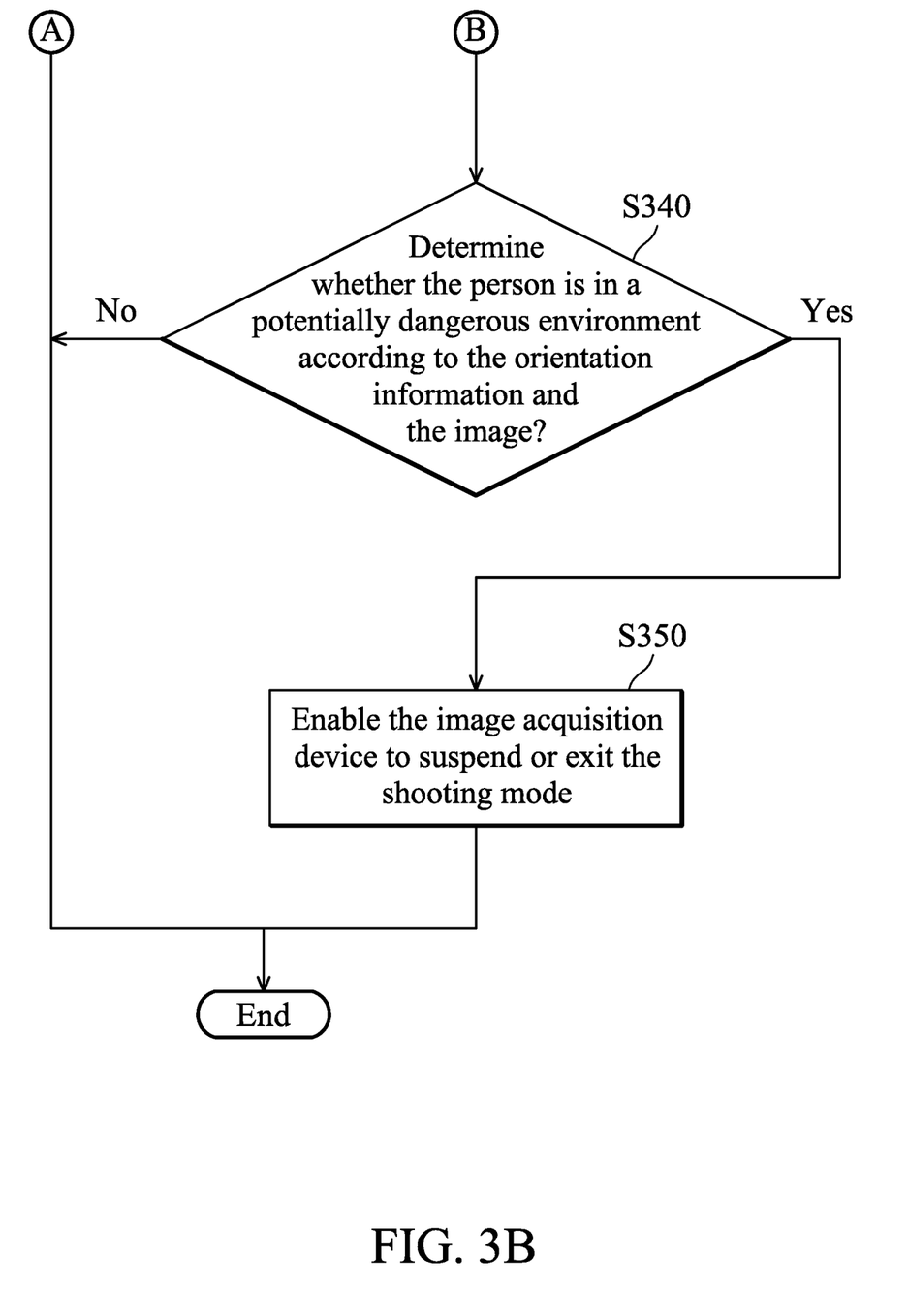

FIGS. 3A and 3B show a flow chart illustrating the method for preventing a person from taking a dangerous selfie according to another embodiment of the application. In this embodiment, the method is applied to a mobile electronic apparatus capable of taking pictures, such as the mobile electronic apparatus 100, which at least includes an image acquisition device (e.g., image acquisition device 10) disposed on a surface (e.g., the front surface or back surface of the mobile electronic apparatus 100), and a multi-axis sensing device (e.g., the multi-axis sensing device 30).

To further clarify, the method may be implemented as a software module (e.g., an APP) consisting of program code which may be loaded and executed by a controller (e.g., the controller 50) of the mobile electronic apparatus.

To begin with, the mobile electronic apparatus determines whether the image acquisition device has entered the shooting mode (step S310). In one embodiment, the mobile electronic apparatus is a smartphone or panel PC, and it may determine whether the image acquisition device has entered the shooting mode by checking if the front camera or back camera is activated or not. Generally speaking, the shooting mode may also be referred to as the selfie mode when the front camera is activated. Alternatively, when the back camera is activated, it may also be used for taking selfies with the use of an assistive device (e.g., a shutter remote control). In another embodiment, the mobile electronic apparatus is a hand-held image or video camera with a revolvable screen, and it may determine whether the image acquisition device has entered the shooting mode by checking if the revolvable screen is manually switched to face the same direction as the camera does.

Subsequent to step S310, if the image acquisition device has entered the shooting mode, the mobile electronic apparatus determines its orientation according to the detection result obtained from the multi-axis sensing device (step S320). The detailed description regarding the orientation information of the mobile electronic apparatus is similar to step S220 in the embodiment of FIG. 2, and thus, it is omitted herein for brevity.

Subsequent to step 310, if the image acquisition device has not entered the shooting mode, no action is performed and the method ends.

Figure 4:
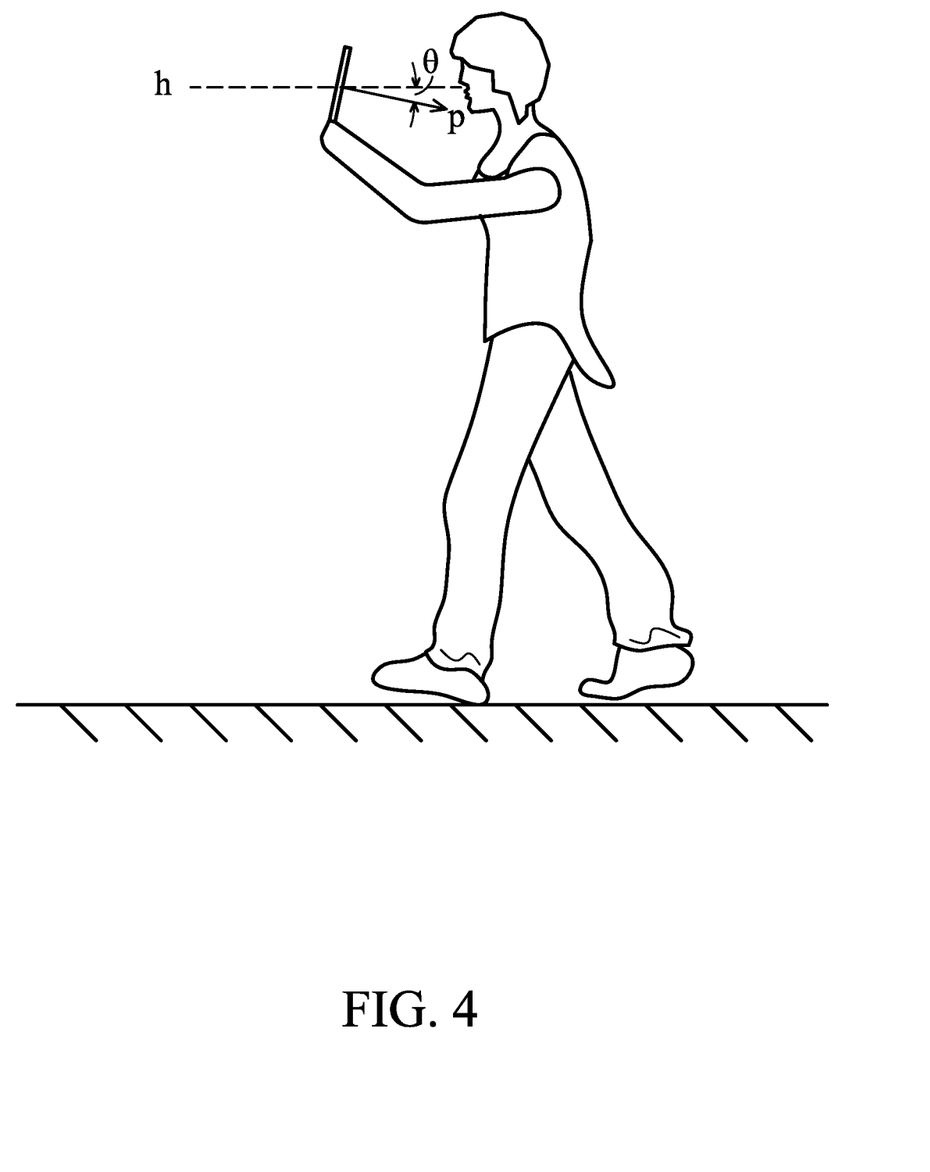
FIG. 4 is a schematic diagram illustrating an exemplary orientation of the mobile electronic apparatus.

Subsequent to step 320, the mobile electronic apparatus determines whether its orientation indicates that the surface on which the image acquisition device is disposed tilts down at a dip angle (i.e., the surface is facing a predetermined direction at a dip angle) (step S330). For example, the mobile electronic apparatus may be a smartphone and the surface may be the front surface where the screen is disposed. In a preferred embodiment, the surface tilting down at a dip angle may suggest that the person (e.g., the user of the mobile electronic apparatus) is taking a selfie. FIG. 4 is a schematic diagram illustrating an exemplary orientation of the mobile electronic apparatus. As shown in FIG. 4, the mobile electronic apparatus is a smartphone, and the dip angle is defined using the horizontal line (denoted as h) as the reference. Specifically, the dip angle refers to the angle (denoted as θ) that the screen (i.e., the front surface) of the smartphone is facing (denoted with the axis p) relative to the horizontal line.

Subsequent to step S330, if the surface on which the image acquisition device is disposed does not tilt down at a dip angle, the method ends.

Subsequent to step S330, if the surface on which the image acquisition device is disposed tilts down at a dip angle, the mobile electronic apparatus determines whether the person is in a potentially dangerous environment (e.g., a cliff, or the edge of a high spot in a building) according to the orientation information detected by the multi-axis sensing device and the image captured by the image acquisition device (step S340). The details of step S340 will be described later in FIGS. 5 and 6A~6D.

Subsequent to step S340, if the person is in a potentially dangerous environment, the mobile electronic apparatus enables the image acquisition device to suspend or exit the shooting mode (step S350), and the method ends. The suspension or exit of the shooting mode may prevent the person from taking selfies, by enabling the image acquisition device to enter the protection mode, or by suspending/deactivating the image acquisition device. Taking the mobile electronic apparatus being a smartphone as an example, the suspension or exit of the shooting mode may include deactivating the image acquisition device and returning the smartphone to the desktop view.

Subsequent to step 340, if the person is not in a potentially dangerous environment, no action is performed and the method ends.

In another embodiment, a new step may be included subsequent to step S350 in FIG. 3B, wherein the new step is to ignore any wireless signal requesting control over the image acquisition device, so as to prevent the person from taking a selfie through wireless access.

In another embodiment, a new step may be inserted between steps S330 and S340 in FIG. 3B, wherein the new step is to identify if a human face appears in the image, and if so, the method proceeds to step S340, and if not, the method ends. That is, the step of human face identification is performed to further confirm if the person is really taking a selfie.

It should be understood that both the new step of ignoring wireless control signals and the new step of human face identification may be added to the embodiment of FIGS. 3A and 3B.

Figure 5:
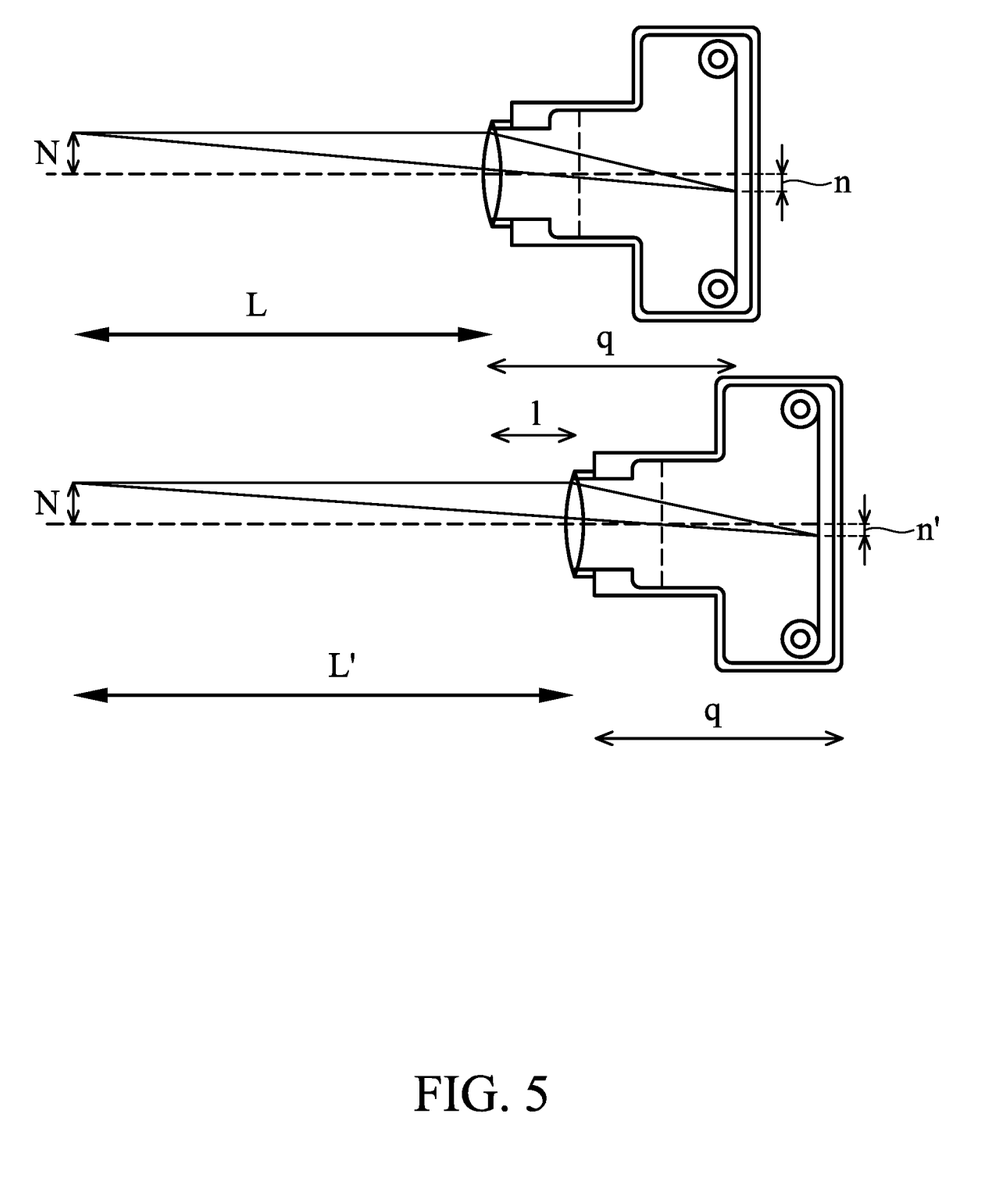
FIG. 5 is a schematic diagram illustrating the determination of whether the person in the image is in a potentially dangerous environment according to an embodiment of the application.

FIG. 5 is a schematic diagram illustrating the determination of whether the person in the image is in a potentially dangerous environment according to an embodiment of the application. Firstly, the spatial position and the dip angle of the mobile electronic apparatus are first determined based on the detection result obtained from the multi-axis sensing device. Secondly, the skyline and earth-line in the image are determined according to the spatial position and the dip angle. Thirdly, the change in height of a background object in the image, which is the result of movement of the mobile electronic apparatus, is analyzed. Lastly, the distance from the background object to the mobile electronic apparatus is calculated according to the information regarding the change in height of the background object in the image and the movement of the mobile electronic apparatus.

In this embodiment, the height of the background object (e.g., a tree) is denoted as H, and the mobile electronic apparatus is depicted as a hand-held image camera. As shown in FIG. 5, before the mobile electronic apparatus is moved, the distance from the background object to the camera is denoted as L, the distance from the camera to the formatted image is denoted as q, and the height of the background object in the image is denoted as n. After the mobile electronic apparatus is moved to the right horizontally with a distance l, the distance from the background object to the camera becomes L', and the height of the background object in the image becomes n'.

According to the lens formula, the lens magnification ratio M may be represented as $$M = \frac{n}{N} = \frac{q}{L},$$

and the distance L may be derived from this mathematical relation, as follows.

$$n = \frac{q}{L} \times N$$

$$n' = \frac{q}{L'}N = \frac{q}{L+l}N$$

$$\frac{n}{n'} = \frac{L+l}{L} = 1 - \frac{l}{L}$$

$$L = \frac{l}{1 - \frac{n}{n'}}$$

The distance l may be obtained from the detection result provided by the multi-axis sensing device, and the image heights n and n' may be obtained from the number of pixels of the background object in the image. Accordingly, the distance L may be calculated.

Likewise, the distance D from the person (assuming there is a person in front of the camera) to the camera may be determined. Subsequently, it may be determined whether the distance from the background object to the person is greater than a predetermined threshold according to the distances L and D. If the distance from the background object to the person is greater than the predetermined threshold, it may be determined that the person is in a potentially dangerous environment. In one embodiment, the predetermined threshold may be 10 meters.

FIGS. 6A to 6D are schematic diagrams illustrating the determination of whether the person in the image is in a potentially dangerous environment according to an embodiment of the application. Firstly, the spatial position and the dip angle of the mobile electronic apparatus are first determined based on the detection result obtained from the multi-axis sensing device. Secondly, the skyline and earth-line in the image are determined according to the spatial position and the dip angle. Lastly, the variations of grey scales of the pixels along the skyline or earth-line are analyzed.

Figure 6A:
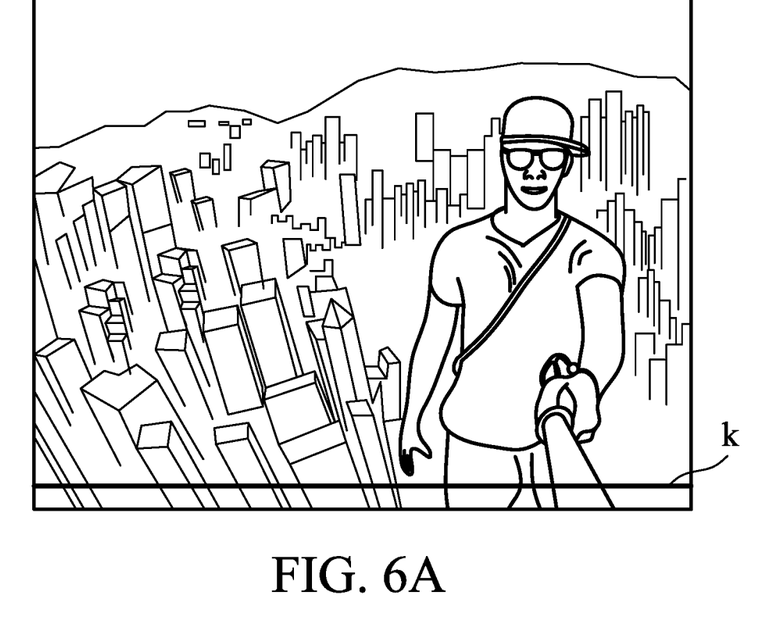
FIG. 6A depicts an exemplary image captured by the image acquisition device.
Figure 6B:
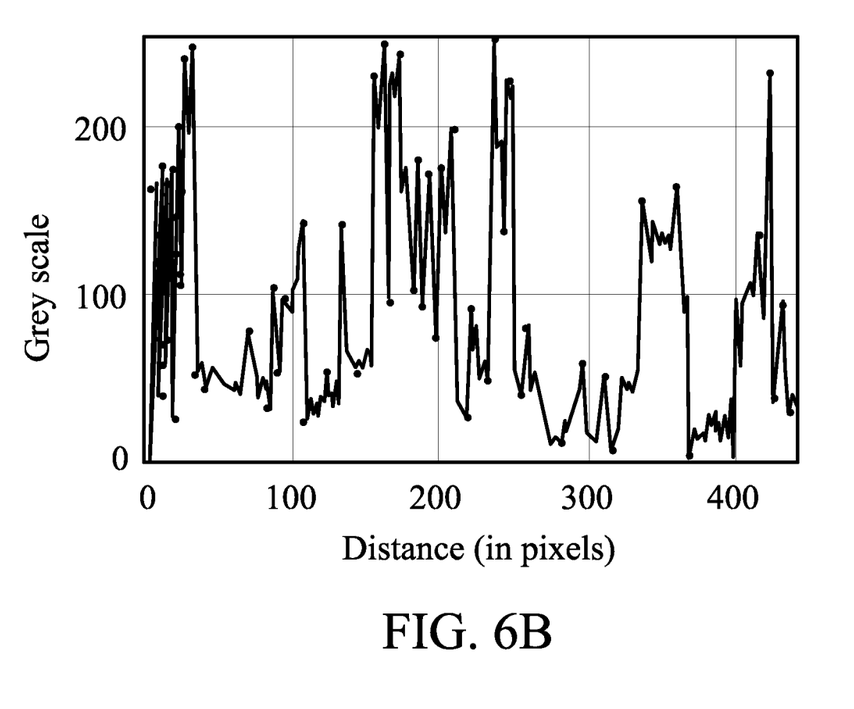
FIG. 6B depicts the distribution of the variations of grey scales of the pixels along the earth-line k.

FIG. 6A depicts an exemplary image captured by the image acquisition device. As shown in FIG. 6A, the earth-line k in the image is determined. FIG. 6B depicts the distribution of the variations of grey scales of the pixels along the earth-line k. As shown in FIG. 6B, grey scales fluctuate intensely, wherein each variation of grey scales may represent a common border of objects in the background, and a higher variation may indicate a more complicated composition of objects in the background. Generally, an image taken from a higher ground may cover more objects in the background, and thus, may have more drastic variations of grey scales. Therefore, when the variations of grey scales of the pixels along the earth-line are drastic, it may be determined that the image was taken from a high ground and that the person is in a potentially dangerous environment.

Specifically, within the pixels 0~100, there are 28 crests and troughs formed by the grey-scale variation over 50. Within the pixels 100~200, there are 14 crests and troughs formed by the grey-scale variation over 50. Within the pixels 200~300, there are 13 crests and troughs formed by the grey-scale variation over 50. Overall, the average number of crests and troughs within every 100 pixels is greater than 5, and thus, it may be determined that the person is in a potentially dangerous environment.

Figure 6C:
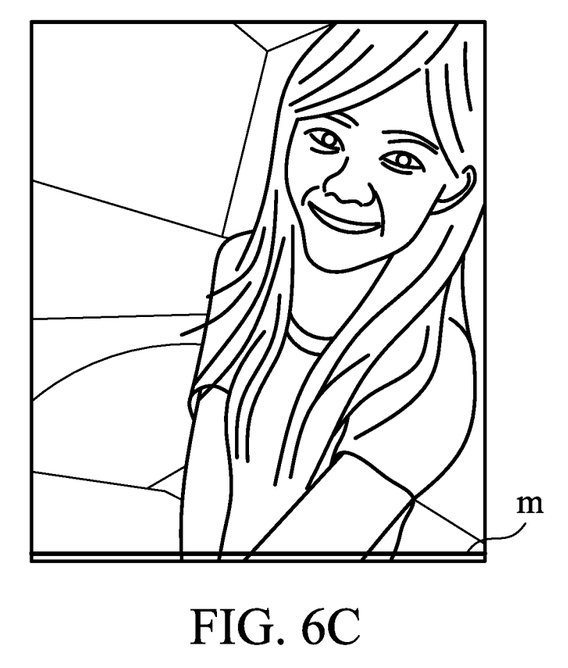
FIG. 6C depicts another exemplary image captured by the image acquisition device.
Figure 6D:
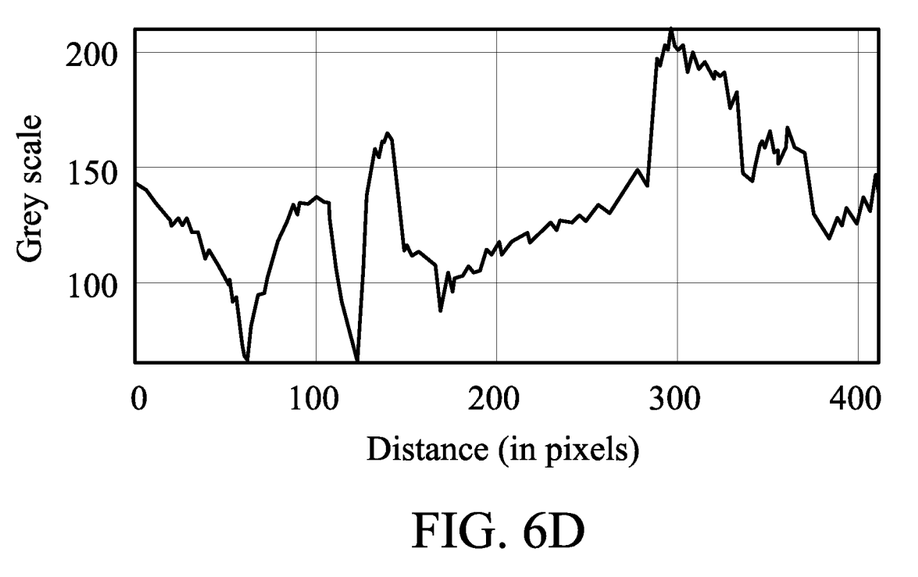
FIG. 6D depicts the distribution of the variations of grey scales of the pixels along the earth-line m.

FIG. 6C depicts another exemplary image captured by the image acquisition device. As shown in FIG. 6C, the earth-line m in the image is determined. FIG. 6D depicts the distribution of the variations of grey scales of the pixels along the earth-line m. As shown in FIG. 6D, grey scales fluctuate less intensely, when compared to FIG. 6B. Overall, the average number of crests and troughs within every 100 pixels is less than 5, and thus, it may be determined that the person is not in a potentially dangerous environment.

It should be understood that the threshold value 5 described in the embodiments of FIGS. 6A~6D is for illustrative purposes only and is not intended to limit the scope of the application.

Figure 7A:
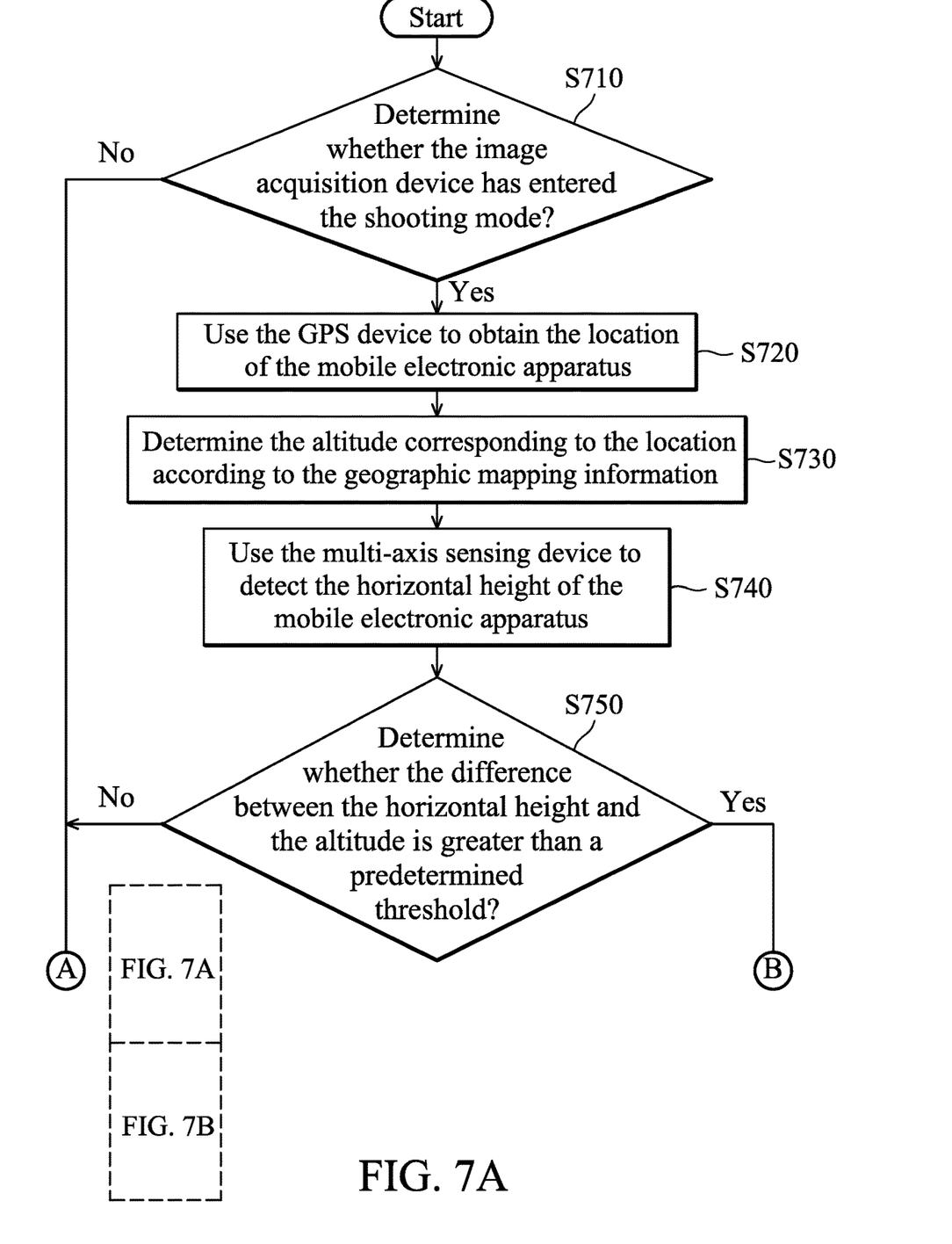
FIGS. 7A and 7B show a flow chart illustrating the method for preventing a person from taking a dangerous selfie according to yet another embodiment of the application.
Figure 7B:
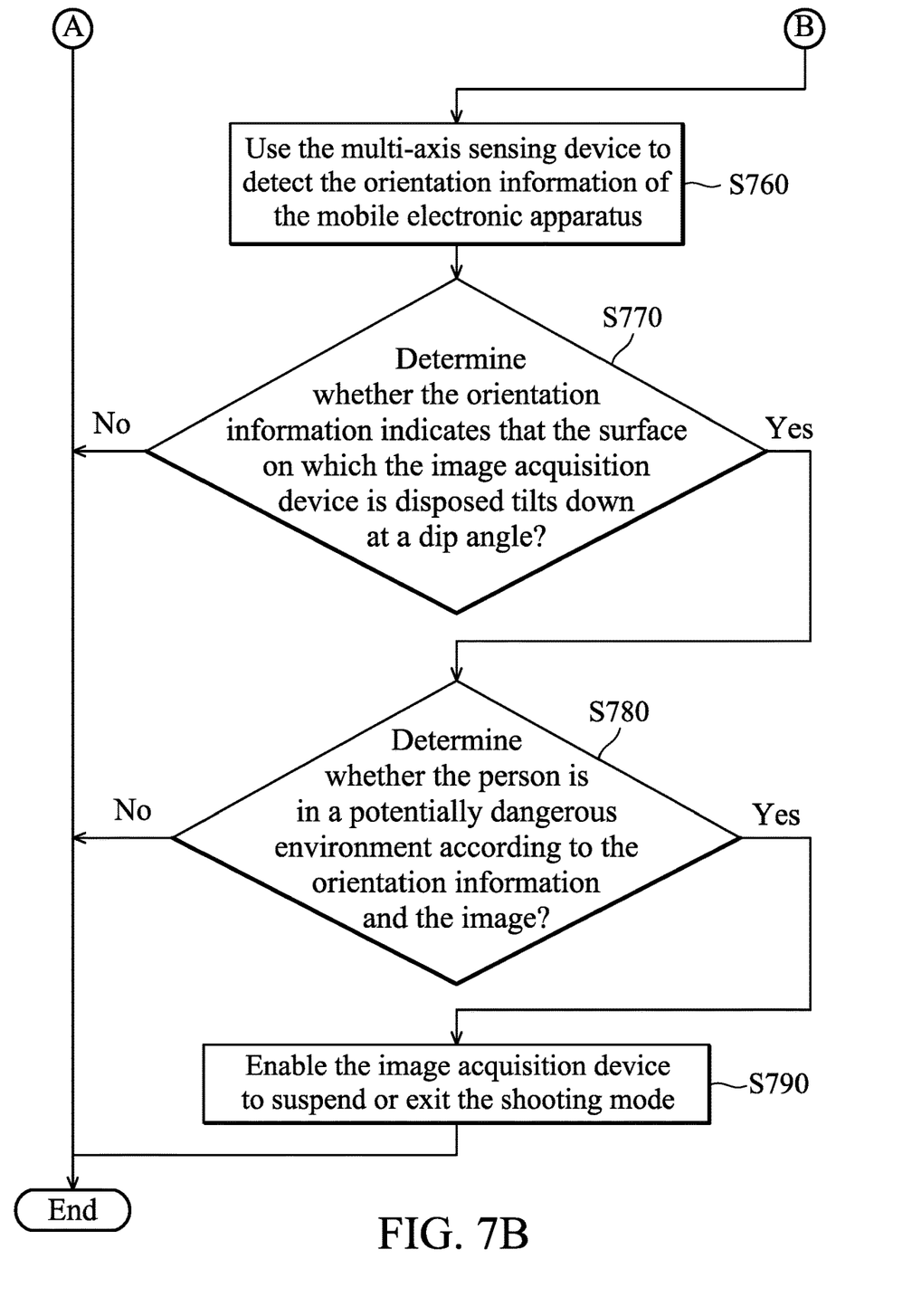

FIGS. 7A and 7B show a flow chart illustrating the method for preventing a person from taking a dangerous selfie according to yet another embodiment of the application. In this embodiment, the method is applied to a mobile electronic apparatus capable of taking pictures, such as the mobile electronic apparatus 100, which at least includes an image acquisition device (e.g., image acquisition device 10) disposed on a surface (e.g., the front surface or back surface of the mobile electronic apparatus 100), and a multi-axis sensing device (e.g., the multi-axis sensing device 30).

To further clarify, the method may be implemented as a software module (e.g., an APP) consisting of program code which may be loaded and executed by a controller (e.g., the controller 50) of the mobile electronic apparatus.

To begin with, the mobile electronic apparatus determines whether the image acquisition device has entered the shooting mode (step S710). In one embodiment, the mobile electronic apparatus is a smartphone or panel PC, and it may determine whether the image acquisition device has entered the shooting mode by checking if the front camera or back camera is activated or not. Generally speaking, the shooting mode may also be referred to as the selfie mode when the front camera is activated. Alternatively, when the back camera is activated, it may also be used for taking selfies with the use of an assistive device (e.g., a shutter remote control). In another embodiment, the mobile electronic apparatus is a hand-held image or video camera with a revolvable screen, and it may determine whether the image acquisition device has entered the shooting mode by checking if the revolvable screen is manually switched to face the same direction as the camera does.

Subsequent to step S710, if the image acquisition device has entered the shooting mode, the mobile electronic apparatus uses the GPS device to obtain its location (step S720). Otherwise, if the image acquisition device has not entered the shooting mode, the method ends.

Subsequent to step S720, the mobile electronic apparatus determines the altitude corresponding to its location according to the geographic mapping information (step S730), and then uses the multi-axis sensing device (e.g., the altitude sensor within the multi-axis sensing device) to detect its horizontal height (step S740).

Subsequent to step S730, the mobile electronic apparatus determines whether the difference between its horizontal height and the altitude is greater than a predetermined threshold (step S750), and if not, the method ends. In one embodiment, the predetermined threshold may be 10 meters but not limited thereto.

Subsequent to step S750, if the difference is greater than a predetermined threshold, it may be determined that the person in the image is in a building at that location, and the mobile electronic apparatus uses the multi-axis sensing device to detect the orientation information (step S760).

Subsequent to step S760, the mobile electronic apparatus determines whether the orientation information indicates that a specific surface (e.g., the surface on which the image acquisition device is disposed) of the mobile electronic apparatus tilts down at a dip angle (i.e., the surface is facing a predetermined direction at a dip angle) (step S770). For example, the mobile electronic apparatus may be a smartphone and the surface may be the front surface where the screen is disposed. In a preferred embodiment, the surface tilting down at a dip angle may suggest that the person (e.g., the user of the mobile electronic apparatus) is taking a selfie, as shown in FIG. 4.

Subsequent to step S770, if the surface does not tilt down at a dip angle, the method ends.

Subsequent to step S770, if the surface tilts down at a dip angle, the mobile electronic apparatus determines whether the person is in a potentially dangerous environment (e.g., a cliff, or the edge of a high spot of a building) according to the orientation information detected by the multi-axis sensing device and the image captured by the image acquisition device (step S780). The reference regarding detailed description of step S780 may be made to the embodiments of FIGS. 5 and 6A~6D as mentioned above.

Subsequent to step S780, if the person is in a potentially dangerous environment, the mobile electronic apparatus enables the image acquisition device to suspend or exit the shooting mode (step S790), and the method ends. The suspension or exit of the shooting mode may prevent the person from taking selfies, by enabling the image acquisition device to enter the protection mode, or by suspending/deactivating the image acquisition device. Taking the mobile electronic apparatus being a smartphone as an example, the suspension or exit of the shooting mode may include deactivating the image acquisition device and returning the smartphone to the desktop view.

Subsequent to step 780, if the person is not in a potentially dangerous environment, the method ends.

In another embodiment, a wireless station may be disposed in a certain area (e.g., a high-floor observation deck) within a building to broadcast a wireless signal indicating that the coverage area of the wireless signal is dangerous, and a new step may be included subsequent to the 'YES' branch of step S780 in FIG. 7B, wherein the new step is performed to check whether such a broadcast signal has been received, and if so, step S790 is performed. Otherwise, if such a broadcast signal has not been received, it may suggest that the person is in a safe area (e.g., indoors) on the high floor of the building, and step S790 may not be performed.

In another embodiment, a new step may be included subsequent to step S790 in FIG. 7B, wherein the new step is to ignore any wireless signal requesting control over the image acquisition device, so as to prevent the person from taking a selfie through wireless access.

In another embodiment, a new step may be inserted between steps S770 and S780 in FIG. 7B, wherein the new step is to identify if a human face appears in the image, and if so, the method proceeds to step S780, and if not, the method ends. That is, the step of human face identification is performed to further confirm if the person is really taking a selfie.

It should be understood that both the new step of ignoring wireless control signals and the new step of human face identification may be added to the embodiment of FIGS. 7A and 7B.

In view of the forgoing embodiments, it will be appreciated that the present application may prevent the user of a mobile electronic apparatus from taking dangerous selfies, by detecting whether the user in the captured image is in a potentially dangerous environment according to the image acquisition device, the multi-axis sensing device, and/or the positioning device of the mobile electronic apparatus, and enabling the image acquisition device to suspend or exit the shooting mode. Advantageously, accidents caused by taking dangerous selfies may be avoided.

While the application has been described by way of example and in terms of preferred embodiment, it should be understood that the application cannot be limited thereto. Those who are skilled in this technology can still make various alterations and modifications without departing from the scope and spirit of this application. Therefore, the scope of the present application shall be defined and protected by the following claims and their equivalents.

Note that use of ordinal terms such as "first", "second", etc., in the claims to modify a claim element does not by itself connote any priority, precedence, or order of one claim element over another or the temporal order in which acts of the method are performed, but are used merely as labels to distinguish one claim element having a certain name from another element having the same name (except for use of ordinal terms), to distinguish the claim elements.

What is claimed is:

1. A method for preventing a person from taking a dangerous selfie, executed by a mobile electronic apparatus comprising a multi-axis sensing device and an image acquisition device disposed on a surface of the mobile electronic apparatus, the method comprising:
   using the image acquisition device operating in a shooting mode to capture an image of the person in a background;
   using the multi-axis sensing device to detect orientation information of the mobile electronic apparatus, wherein the multi-axis sensing device comprises one or more of an acceleration sensor, a magneto sensor, a gyroscope sensor, and an altitude sensor;
   determining whether the person is in a potentially dangerous environment according to the orientation information and the image; and
   enabling the image acquisition device to suspend or exit the shooting mode in response to determining that the person is in the potentially dangerous environment according to the orientation information detected by the multi-axis sensing device and the image captured by the image acquisition device.

2. The method of claim 1, further comprising:
   determining whether the surface is facing a predetermined direction at a dip angle according to the orientation information;
   wherein the determination of whether the person is in the potentially dangerous environment is performed when the surface is facing the predetermined direction at the dip angle.

3. The method of claim 1, wherein the determining of whether the person is in the potentially dangerous environment further comprises:
   determining a first distance from the image acquisition device to the person and a second distance from the image acquisition device to the background;
   determining whether a difference between the first distance and the second distance is greater than a predetermined threshold; and
   determining that the person is in the potentially dangerous environment when the difference is greater than the predetermined threshold.

4. The method of claim 1, wherein the determining of whether the person is in the potentially dangerous environment further comprises:
   determining a base line in the image according to the orientation information; and
   determining whether the person is in the potentially dangerous environment according to variations of grey scales of pixels along the base line in the image.

5. The method of claim 1, further comprising:
   detecting a location of the mobile electronic apparatus;
   detecting a horizontal height of the mobile electronic apparatus;
   determining an altitude corresponding to the location according to geographic mapping information; and
   determining whether a difference between the horizontal height and the altitude is greater than a predetermined threshold;
   wherein the determination of whether the person is in the potentially dangerous environment is performed when the difference is greater than the predetermined threshold.

6. The method of claim 1, further comprising:
   determining whether a wireless signal is received indicating that a coverage area of the wireless signal is dangerous, when the person is in the potentially dangerous environment;
   wherein the image acquisition device is enabled to suspend or exit the shooting mode when the wireless signal is received.

7. The method of claim 1, further comprising:
   receiving a wireless signal which requests control over the image acquisition device; and
   ignoring the wireless signal when the person is in the potentially dangerous environment.

8. The method of claim 1, further comprising:
   determining whether a human face is identified in the image;
   wherein the determination of whether the person is in the potentially dangerous environment is performed when the human face is identified in the image.

9. A mobile electronic apparatus, comprising:
   an image acquisition device, disposed on a surface of the mobile electronic apparatus, and configured to capture an image of a person in a background;
   a multi-axis sensing device, comprising one or more of an acceleration sensor, a magneto sensor, a gyroscope sensor, and an altitude sensor, and configured to detect orientation information of the mobile electronic apparatus; and
   a controller, configured to determine whether the person is in a potentially dangerous environment according to the orientation information and the image, and enable the image acquisition device to suspend or exit the shooting mode in response to determining that the person is in the potentially dangerous environment according to the orientation information detected by the multi-axis sensing device and the image captured by the image acquisition device.

10. The mobile electronic apparatus of claim 9, wherein the controller is further configured to determine whether the surface is facing a predetermined direction at a dip angle according to the orientation information, and the determining of whether the person is in the potentially dangerous environment is performed when the surface is facing the predetermined direction at the dip angle.

11. The mobile electronic apparatus of claim 9, wherein the determining of whether the person is in the potentially dangerous environment further comprises:
  determining a first distance from the image acquisition device to the person and a second distance from the image acquisition device to the background;
  determining whether a difference between the first distance and the second distance is greater than a predetermined threshold; and
  determining that the person is in the potentially dangerous environment when the difference is greater than the predetermined threshold.

12. The mobile electronic apparatus of claim 9, wherein the determining of whether the person is in the potentially dangerous environment further comprises:
  determining a base line in the image according to the orientation information; and
  determining whether the person is in the potentially dangerous environment according to variations of grey scales of pixels along the base line in the image.

13. The mobile electronic apparatus of claim 9, further comprising:
  a positioning device, configured to detect a location of the mobile electronic apparatus;
  wherein the multi-axis sensing device is further configured to detect a horizontal height of the mobile electronic apparatus;
  wherein the controller is further configured to determine an altitude corresponding to the location according to geographic mapping information, and determine whether a difference between the horizontal height and the altitude is greater than a predetermined threshold; and
  wherein the determining of whether the person is in the potentially dangerous environment is performed when the difference is greater than the predetermined threshold.

14. The mobile electronic apparatus of claim 9, further comprising:
  a wireless communication device, configured to receive a wireless signal;
  wherein the controller is further configured to determine whether the wireless signal indicates that a coverage area of the wireless signal is dangerous, when the person is in the potentially dangerous environment; and
  wherein the image acquisition device is enabled to suspend or exit the shooting mode when the wireless signal indicates that the coverage area of the wireless signal is dangerous.

15. The mobile electronic apparatus of claim 9, further comprising:
  a wireless communication device, configured to receive a wireless signal;
  wherein the controller is further configured to determine whether the wireless signal requests control over the image acquisition device when the person is in the potentially dangerous environment, and ignore the wireless signal when the wireless signal requests control over the image acquisition device.

16. The mobile electronic apparatus of claim 9, wherein the controller is further configured to determine whether a human face is identified in the image, and the determining of whether the person is in the potentially dangerous environment is performed when the human face is identified in the image.

17. A non-transitory computer-readable storage medium comprising computer program which, when executed, causes a mobile electronic apparatus comprising a multi-axis sensing device and an image acquisition device disposed on a surface of the mobile electronic apparatus to perform a method for preventing a person from taking a dangerous selfie, wherein the method comprises:
  using the image acquisition device operating in a shooting mode to capture an image of the person in a background;
  using the multi-axis sensing device to detect orientation information of the mobile electronic apparatus, wherein the multi-axis sensing device comprises one or more of an acceleration sensor, a magneto sensor, a gyroscope sensor, and an altitude sensor;
  determining whether the person is in a potentially dangerous environment according to the orientation information and the image; and
  enabling the image acquisition device to suspend or exit the shooting mode, in response to determining that the person is in the potentially dangerous environment according to the orientation information detected by the multi-axis sensing device and the image captured by the image acquisition device.

* * * * *